Patented Sept. 17, 1946

2,407,895

UNITED STATES PATENT OFFICE 2,407,895

PROCESSES FOR RESOLVING OIL-IN-WATER EMULSIONS

Louis T. Monson, Alhambra, William W. Anderson, Montebello, and Fred W. Jenkins, Los Angeles, Calif., assignors to Petrolite Corporation, Ltd., Wilmington, Del., a corporation of Delaware No Drawing. Application October 5, 1944, Serial No. 557,374

8 Claims. (Cl. 252—344)

This invention relates to a process for resolving or separating emulsions of the oil-in-water type, and particularly emulsions in which a petroleum material is dispersed or distributed in small drops in a continuous aqueous phase. Especially, it relates to the clarification of oil field waters containing comparatively small amounts of crude petroleum oil, which oil is relatively stably dispersed in water or in a brine. The process is applicable to the resolution of other emulsions of the oil-in-water type, e. g., to waxhexane-water emulsions encountered in de-waxing operations in petroleum refining. We have found that the process is also useful for the following purposes, to wit: for separating butadiene tar-in-water emulsions which occur in the manufacture of butadiene by the cracking of heavy naphthas in gas generators, especially in the wash box circulating water in such systems; for the removal of the traces of oil from steam condensate, as in cylinder emulsion, in the operation of steam pumps; for the separation of the small proportions of oil which occur in marine ballast water; and for the resolution of oil-in-water emulsions formed in the cracking of butylene to butadiene.

By far the vast majority of naturally-occurring petroleum emulsions are of the water-in-oil type and comprise fine droplets of naturally-occurring waters or brines dispersed in a more or less permanent state throughout the oil, which constitutes the continuous phase of the emulsion. They are obtained from producing wells and from the bottom of oil storage tanks, and are commonly referred to as "cut oil," "roily oil," "emulsified oil," and "bottom settlings." The present invention is not concerned with the treatment of such conventional emulsions. Their resolution comprises an entirely different problem.

In certain oil fields there are produced crude oil emulsions, which, instead of being of the water-in-oil type, are of the oil-in-water type, and comprise small droplets of naturally-occurring petroleum oil dispersed in a more or less permanent state throughout the water, or relatively dilute brine, which constitutes the continuous phase of the emulsion. So far as we are aware, the expressions "cut oil," "roily oil," etc., commonly used to designate conventional water-in-oil emulsions, are not used to designate or refer to the natural oil-in-water type petroleum emulsions to which our invention relates, and which our process is capable of resolving effectively, in order to recover the oil therein contained. The natural oil-in-water type emulsions of petroleum oil are sometimes referred to as "dirty water," "brown water," "oily water," "oily draw-off," etc.

Although such emulsions are recognized generally as being of the oil-in-water type, their constitution and characteristics are only partially understood. It is recognized that the dispersed phase may comprise as little as only 50 parts per million of oil in the emulsion. In extreme cases, the oil content may be as high as 20%. In general, the oil content is 1% or less of the emulsion, and in the large majority of instances where such emulsions are encountered and are required to be resolved, the oil content is of the order of 0.2% or even 0.1% or less. The stability of these systems is dependent on many factors, few of which are understood to any important degree. The present process is not believed to depend for its effectiveness on the application of simple laws, because we have found it to have a high order of effectiveness when employed to resolve emulsions produced from refined petroleum products and water, as well as when it is employed to resolve emulsions of crude petroleum and water, or emulsions comprising other non-aqueous media and water.

The process which constitutes our present invention consists in subjecting an emulsion of oil-in-water to the action of a reagent or demulsifier of the kind subsequently described, thereby causing the oil particles in the emulsion to coalesce sufficiently to rise to the surface of the water (or settle to the bottom if the oil density is greater than the water density), when the mixture is allowed to stand in the quiescent state after treatment with the reagent or demulsifier.

The reagents employed as the demulsifier in our process, consist of surface-active heat-polymerized aminoalcohols which in monomeric form are secondary, or tertiary amines containing at least two alkanol or hydroxyalkyl radicals.

Briefly stated, such compounds may be obtained by the polymerization of triethanolamine, tripropanolamine, or the like, in such a manner as to eliminate water and produce ether linkages. Such polymers, consisting of tetramers or more highly polymerized forms such as pentamers, hexamers, etc., and including decamers, or even more highly polymerized forms, are characterized by showing surface-activity. This means their dilute solutions have the ability to cause foam, to reduce the surface tension of water, to act as emulsifiers, etc. The exact composition cannot be depicted by the usual chemical formulas, for the reason that the structures may be cyclic or acyclic, or both, and subject to wide variations. The primary reaction is unquestionably etherization, although if some secondary amine as, for example, diethanolamine, dipropanolamine, or the like is present, it is barely possible that water is also eliminated to some degree by a reaction other than etherization, with the result that two nitrogen atoms are united by an alkylene radical, as distinguished from an alkyleneoxyalkylene radical.

Even though the exact structure of the surface-active heat - polymerized alkanolamines herein contemplated is not fully understood, it is to be noted that their method of manufacture is well known and that they are used commercially for various purposes. The hereinafter included description is typical of the conventional polymers. The alkanolamines having a single nitrogen atom, i. e., monoamines, and particularly those which represent secondary or tertiary amines, may be contemplated in their simplest aspect as oxyalkylated derivatives of ammonia. For example, even though diethanolamine and triethanolamine may be manufactured in various ways, such compounds can be manufactured by treating one mole of ammonia with two or three moles of ethylene oxide. Analogs are prepared by the use of other alkylene oxides containing a reactive ethylene oxide ring, as, for example, propylene oxide, butylene oxide, glycid or methyl-glycid. Such products need not be derived directly from ammonia, but may be derived from primary amines containing an aliphatic radical having 6 carbon atoms or less, as, for example, methylamine, ethylamine, propylamine, butylamine, amylamine, and hexylamine.

It is to be noted that if a product like triethanolamine is treated with an excess of an oxyethylating agent, for instance, ethylene oxide, one introduces the oxyethylene radical between the terminal hydrogen atom and the adjacent oxygen atom. Thus, ether-aminoalcohols obtained by reacting triethanolamine or tripropanolamine with one or two or even with three to nine moles of ethylene oxide, are well known. The other similar etheraminoalcohols are derived in the same manner and require no further description. For purposes of clarity the secondary or tertiary amines herein contemplated as raw materials or reactants for polymerization, may be summarized by the following formula:

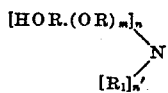

wherein OR is an alkylene oxide radical having 4 carbon atoms or less, and preferably, is the ethylene oxide radical. As indicated, OR may be the propylene oxide radical, the butylene oxide radical, the glycid radical, or the methyl glycid radical; $R_1$ is a member of the class consisting of hydrogen atoms and alkyl radicals having 6 carbon atoms or less; $m$ represents a numeral varying from 0 to 3; $n$ represents the numeral 2 or 3; and $n'$ represents the numeral 0 or 1, with the proviso that $n+n'=3$.

Previous reference has been made to the fact that one may use a secondary or tertiary amine as a raw material. We prefer to use a tertiary amine, and particularly, a tertiary amine containing 3 alkanol radicals; more specifically, we particularly prefer to use triethanolamine, and find that the commercially available product is suitable, in spite of the fact that it contains moderate amounts of diethanolamine, and possibly, smaller amounts of monoethanolamine. It has been previously pointed out that the amino hydrogen atom, as distingushed from the alcoholic hydrogen atom, may enter into the polymerization reaction, without affecting the suitability of the final polymer. It will be pointed out subsequently that the temperatures employed for polymerization are, for instance, in the neighborhood of 250° C.

This means that in most instances, monoethanolamine or diethanolamine, if present originally, may be volatilized and lost before an opportunity presents itself for polymerization. We have found no significant difference, for example. Whether a polymer has been obtained from chemically pure triethanolamine substantially free from diethanolamine and monoethanolamine, or from commercial triethanolamine having minor percentages of the primary or secondary amine present.

In examples hereinafter included, it is noted that the polymer must represent the tetrameric stage, or a higher degree of polymerization, and must be surface-active in the conventional sense previously referred to. The products obtained in the manner hereindescribed, when manufactured in iron vessels, represent viscous deep-amber-colored products, the degree of polymerization can be estimated approximately in the usual manner by loss of water and increase in viscosity. However, it is better to make an actual molecular-weight determination in the usual manner. In any event, a determination which shows surface-activity means that the product is at least in the tetrameric state, and if the product is heated for some period of time after it has shown surface-activity, with further loss of water, and with further increase in viscosity, obviously the degree of polymerization, as far as the average polymer goes, must be beyond or higher than the trimeric state.

The polymerization of the basic hydroxy amines is effected by heating same at elevated temperatures, generally in the neighborhood of 200-270° C., preferably in the presence of catalysts, such as sodium hydroxide, potassium hydroxide, sodium ethylate, sodium glycerate, or catalysts of the kind commonly employed in the manufacture of superglycerinated fats and the like. The proportion of catalyst employed may vary from slightly less than 0.1%, in some instances, to slightly over 1% in other instances. Needless to say, in the event the alcohol-amine is low-boiling, customary precautions must be taken, so as not to lose part of the reactants. On the other hand, conditions must be such as to permit the removal of water formed during the process. At times the process can be conducted most readily by permitting part of the volatile constituents to distil, and subsequently subjecting the vapors to condensation. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distil in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i. e., the effectiveness with which the water of reaction is removed from the combining mass. Polymerization can be effected without the use of catalysts, in the majority of instances, but such procedure is generally undesirable, due to the fact that the reaction takes a prolonged period of time, and usually a significantly higher temperature. It is noted that in the subsequent examples the final compositions of matter which are contemplated are preferably polymerized hydroxylated tertiary amines. Thus, all the subsequent description of polymerized hydroxyamines has been limited largely to the tertiary type, which is obviously the preferred type. However, it must be recognized that polymerized hydroxyamines, particularly if polymerized for a fairly long period of time, at a fairly high temperature, and in the presence of an active catalyst, may result in a polymerization reaction which ends in a product that is water-insoluble, or substantially water-insoluble. Obviously, such water-insoluble material can be obtained more readily from a more highly hydroxylated amine than from a lower one.

The use of the words "surface-active," as herein employed and as generally used, refers to a compound which is water-soluble in the sense that it at least produces a colloidal sol or solution; thus, we do not contemplate the use of products obtained by polymerization to the degree that they are no longer soluble or miscible in water, except as hereafter specified.

Incidentally, it must also be recognized that the speed of reaction and the degree of polymerization are commonly affected by the nature of the vessel in which the reaction takes place. In the examples cited, it is intended that reaction take place in a metal vessel, such as iron. However, in order to obtain the same degree of polymerization when conducting the reaction in a glass-lined vessel, it is quite likely that the period of reaction would have to be increased 150–400%.

Suitable amines have been previously indicated, but the following may be noted in addition: propyl propanolamine, cyclohexyldiethanolamine, cyclohexyldipropanolamine, etc.

Other well known amines which may be employed are the following:

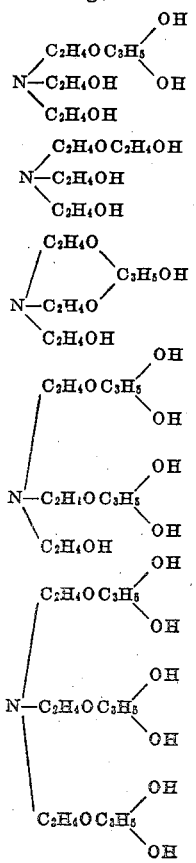

(See U. S. Patent No. 2,290,415, dated July 21, 1942, to De Groote.)

Example 1

One percent of caustic soda is added to commercial triethanolamine and the product heated for approximately three hours at 245–260° C. The mass is stirred constantly, and any distillate is condensed and reserved for re-use after an intermediate re-running step, for purposes of dehydration. At the end of approximately 2½ to 3½ hours, the molecular weight determination shows that the material is largely dimeric.

Example 2

The same procedure is employed as in the previous example, except that heating is continued for approximately another 1½ hours. In this instance, the reaction mass is largely a polymeric material with an average molecular weight range indicating the presence of approximately four to five nitrogen atoms in the polymer.

Example 3

The same procedure is followed as in Example 2, except that a slightly higher temperature, approximately 10° higher, is employed, and a somewhat longer time of reaction, for instance, ½ to 1½ hours longer than in Example 2, preceding. In any event, the reaction is continued until the product obtained either as such, or in the form of the acetate, dissolves or disperses in water in concentrations from 0.1% to 1% to give a foamy solution indicating high surface-activity.

Example 4

Tri-isopropanolamine is substituted for triethanolamine in Examples 1, 2 and 3.

Example 5

Tripentanolamine is substituted for triethanolamine in Examples 1, 2 and 3.

Example 6

Polyethanolamine of the following formula:

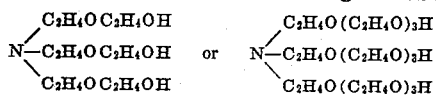

is substituted for triethanolamine in the previous examples.

The entire invention can be applied in an overwhelming majority of instances if one has available only three types of heat-polymerized commercial triethanolamine. One type contemplates the polymerization which approximates on the average the pentameric form, i. e., the tetrameric through the hexameric form. The second type represents the next higher polymerization, which, in the bulk approximates a heptameric state, through the nonameric state. The third class represents, in the bulk, the decameric and somewhat higher states, through and including, for example, the dodecameric state. These three grades or types or varieties of polymers of commercial triethanolamine are economical in cost, easy to prepare, and really are the outstanding reagents for employment in the present process.

It is to be noted that Example 1, preceding, is concerned with the manufacture of a dimeric form. This is included, for the reason that it is sometimes convenient to produce the dimeric or trimeric form, and then subsequently polymerize to a degree showing a considerably increased molecular weight. Thus, at times such interrupted operation may show some conveniences in comparison with a single polymerization step.

Previous reference has been made to the fact that the compounds herein employed must be water-soluble, or, at least, must form a colloidal sol, as exemplified by being miscible with water in the manner previously indicated. It has been pointed out that polymerization may be carried to such a degree that such polymers are water-insoluble. However, they can even then be used, if they are soluble in their salt form. The preferred forms of the amino compounds contemplated for use in our process, are freely dispersible in water in the free or uncombined state. Presumably, such systems, on contact with water, comprise the reagent in the form of a base, i. e., a substituted ammonium compound. In other instances, however, although the free forms of the reagents are substantially water-insoluble, yet the salt forms (e. g., the acetates) are very water-dispersible. In such instances where a free form is water-insoluble, naturally, the salt form may be employed, but in some instances, it may be desirable to use the salt form, even though the corresponding free form is itself water-soluble. We have found, for example, that the acetate, hydroxyacetate, lactate, gluconate, propionate, caprate, phthalate, fumarate, maleate, benzoate, succinate, oxalate, tartrate, chloride, nitrate, or sulfate prepared by the addition of the suitable acid, is a very effective reagent for use in our process. It is to be understood that references to the reagents in these specifications and claims, include the amino compounds in basic form, or in the form of salts of acids, as well as in the free or anhydro forms themselves. It is to be additionally noted that in some instances, and particularly in regard to such reagents as are relatively water-insoluble in free form, it may be desirable to prepare a solution in a non-aqueous solvent, such as aromatic petroleum solvent instead of water.

As stated above, the material may be employed in concentrated form, or it may be diluted with a suitable solvent. We have frequently found water to constitute a satisfactory solvent, because of its availability and negligible cost; but in some cases, we have used non-aqueous solvents, such as aromatic petroleum solvent, in preparing reagents which were effective when used for the purpose of resolving oil-in-water emulsions. Depending on the choice of amino body and its molecular weight, the solubility may be expected to range from ready water-solubility in the free state, to substantial water-insolubility. As stated above, the salts, and specifically the acetates, generally show improved water-solubility over the simple amino bodies; and we have, in some instances, obtained the best results by using salt forms of the amino bodies which possess appreciable water-solubility. Because such reagents are effective in proportions of the order of 10 to 100 parts per million, their solubility in the treating system may be entirely different from their apparent solubility in bulk, in water or oil. Undoubtedly, they have some solubility in both media, within the concentration range employed.

We desire to point out that the superiority of the reagent contemplated in our process is based upon its ability to recover the oil from certain oil-in-water emulsions more advantageously and at somewhat lower cost than is possible with other reagents or other processes. In certain instances, it has been found to resolve emulsions which were not economically or effectively resolvable by any other known means.

In one application of our process, an oil lease which was producing approximately 3,000 barrels of oil daily was in danger of being shut down by State authorities, because it produced, along with the oil, some 20,000 barrels of oil-in-water emulsion having an oil content of approximately 700–1,000 P. P. M. The authorities had prohibited the discharge of this water into the adjacent stream bed, and the oil producer was unable economically and efficiently to remove the small proportion of oil from the water. Prior to the application of our process, various expedients had been in use in an effort to clarify the water prior to discarding it, which expedients included the use of ferric chloride and aluminum sulfate. These reagents produced flocs or slimes, which removed the large proportion of dispersed oil; but disposal of the floc or slime was burdensome and expensive, and the oil so removed was lost. Furthermore, some of the metallic floc remained in the oil phase and rendered its subsequent treatment difficult. By the use of 7 to 8 gallons of our reagent (approximately 10 parts of our reagent per million of emulsion), the oily water was cleaned until it contained only several parts per million of oil and was entirely clear and colorless at the time of being discarded.

In another application of our reagent, an oil-producing lease was producing along with the oil an oil-in-water emulsion containing approximately 8,000 parts per million (P. P. M.) oil. This oil-in-water emulsion was resolved so that the water discharged contained only several hundred parts per million after very brief settling. After the sedimentation time was improved, even this small percentage of residual oil was lowered and the effluent water contained less than 100 P. P. M. of oil. This represents a removal of more than 99% of the oil originally dispersed in the water.

In a butadiene manufacturing plant butylene gas is passed over a catalyst bed along with steam and a hydrocarbon oil, in which process the butylene is cracked and butadiene is produced. The condensation of the steam in the presence of the oil causes the formation of an oil-in-water emulsion containing up to some 5,000 parts oil per million of water. The addition of our reagent in proportions approximating 10–20 parts per million of emulsion, produced a substantially complete stratification of oil and a transparent water layer containing only several parts per million of oil.

Other examples of the successful use of our process could be cited, in which operations were equally near to being shut down, because of inability to dispose of oily water; but the above examples are illustrative of the value of our process. As stated above, we have applied it to other classes of oil-in-water emulsions, including wax-hexane-water emulsions from refineries; steam cylinder emulsions, emulsions of the oil-in-water type which occur in the cooling water systems of plants manufacturing butadiene by the cracking of heavy naphthas, etc. It has successfully resolved emulsions of each of these classes.

In operating our process at the first oil field location mentioned above, we introduced the reagent at any convenient point in the water system, e. g., at the water outlet of the gathering sump in which the oil and water had been received from the various wells on the lease. The chemicalized water containing about 1,000 parts per million of oil then passed to a sump through several lengths of baffled pipe, to facilitate mixing of the reagent and the oil-in-water emulsion. From the first settling sump, it passed to a second, and from there down a natural ravine to a final sump. The water recovered from the last sump did not exceed 20 parts per million in oil content, and frequently showed as little as 5 parts per million. It is important to note that other untreated water was being discharged into the lower part of this system by other operators, and that the results noted are made poorer by such fact.

The baffled pipe mentioned above is only one form of device which we have found suitable to provide desired agitation in practicing our process. Other devices include perforated chamber mixers, excelsior- or mineral- or gravel- or steel-shaving-packed tanks, beds of stones or gravel or minerals in open ducts or trenches, the introduction of oil well gas or air into a tank or pipe in which or through which the mixture of reagent and emulsion are standing or passing, aeration achieved in some other manner, etc.

In general, our process involves the operative steps of introducing the reagent into the emulsion, admixing it therewith, and allowing the separated oil particles to rise to the top or to settle, as gravity dictates, on quiescent standing. We have found that the factors, reagent feed rate, agitation, and settling time, are somewhat interrelated. For example, we have found that if we have sufficient agitation of the proper type, we can shorten the settling time materially. On the other hand, if agitation is not procurable but long standing time is, the process is equally productive of satisfactory results. The reagent feed rate has an optimum range, which, however, is sufficiently wide to meet the tolerances required for the variations in daily operations.

Having thus described our invention, what we claim as new and desire to secure by Letters Patent is:

1. A process for breaking petroleum emulsions of the oil-in-water type, characterized by subjecting the emulsion to the action of a surface-active heat-polymerized aminoalcohol of the formula:

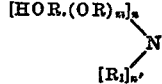

wherein OR is an alkylene oxide radical having not over 4 carbon atoms and selected from the class consisting of ethylene oxide radicals, propylene oxide radicals, butylene oxide radicals, glycid radicals, and methyl glycid radicals consisting of hydrogen atoms and alkyl radicals having 6 carbon atoms or less; $m$ represents a numeral varying from 0 to 3; $n$ represents the numeral 2 or 3; and $n'$ represents the numeral 0 or 1, with the proviso that $n+n'=3$; said heat-polymerized compound being selected from the class consisting of the anhydro base, the hydrated base, and salts.

2. The process of claim 1, wherein the emulsion is a crude petroleum emulsion in which the dispersed phase is not greater than 1% by volume.

3. The process of claim 1, wherein the emulsion is a crude petroleum emulsion in which the dispersed phase is not greater than 1% by volume and wherein $n'$ is 0.

4. The process of claim 1, wherein the emulsion is a crude petroleum emulsion in which the dispersed phase is not greater than 1% by volume, and $n'$ and $m$ are 0.

5. The process of claim 1, wherein the emulsion is a crude petroleum emulsion in which the dispersed phase is not greater than 1% by volume; $n'$ and $m$ are 0; and OR is the ethylene oxide radical.

6. The process of claim 1, wherein the emulsion is a crude petroleum emulsion in which the dispersed phase is not greater than 1% by volume and the agent employed is a heat-polymerized commercial triethanolamine in which the bulk of the polymer is within the range of the tetrameric state through the hexameric state.

7. The process of claim 1, wherein the emulsion is a crude petroleum emulsion in which the dispersed phase is not greater than 1% by volume and the agent employed is a heat-polymerized commercial triethanolamine in which the bulk of the polymer is within the range of the heptameric state through the nonameric state.

8. The process of claim 1, wherein the emulsion is a crude petroleum emulsion in which the dispersed phase is not greater than 1% by volume and the agent employed is a heat-polymerized commercial triethanolamine in which the bulk of the polymer is within the range of the decameric state through the dodecameric state.

LOUIS T. MONSON.
WILLIAM W. ANDERSON.
FRED W. JENKINS.